May 18, 1943.  C. HUSSMAN  2,319,735
HYDRAULIC VIBRATION AND SHOCK ABSORBER
Filed Nov. 7, 1941
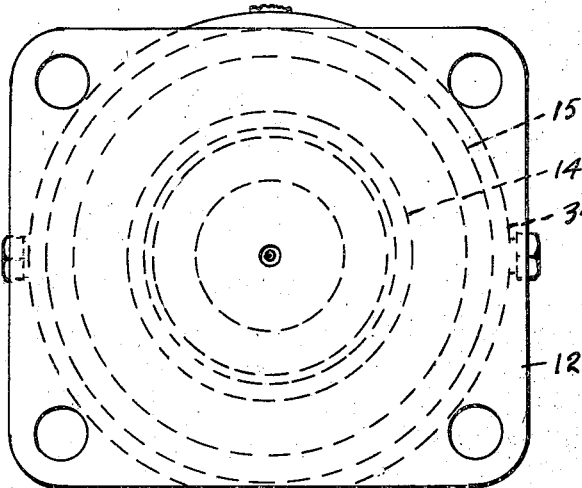
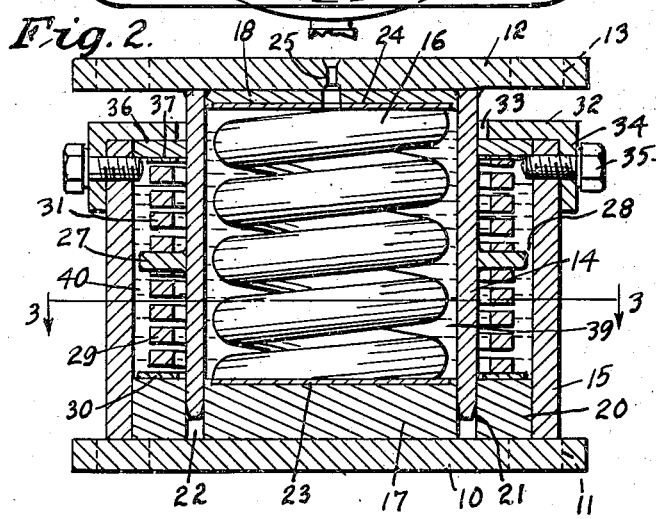
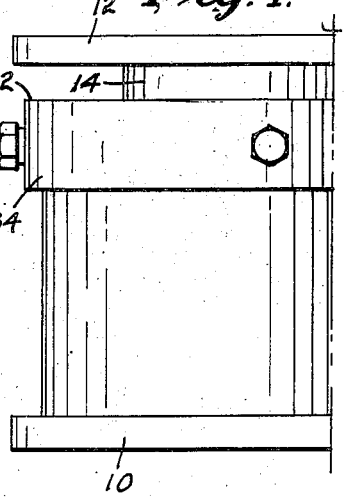
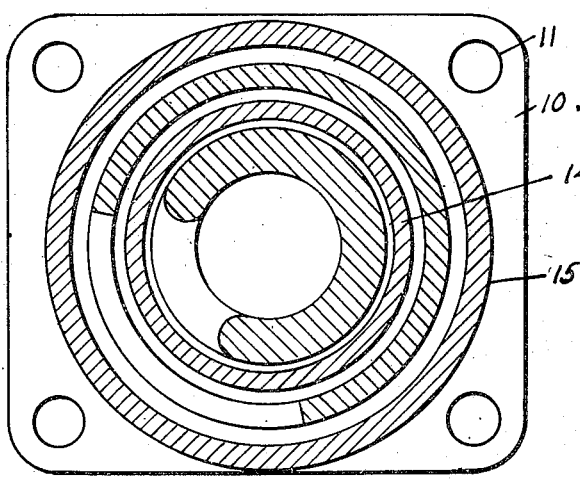
INVENTOR
CARL HUSSMAN
By L. A. Paley Att'y.

Patented May 18, 1943

2,319,735

UNITED STATES PATENT OFFICE 2,319,735

HYDRAULIC VIBRATION AND SHOCK ABSORBER

Carl Hussman, Chicago, Ill.

Application November 7, 1941, Serial No. 418,110

7 Claims. (Cl. 267—1)

This invention relates to vibration and shock absorbers and has reference more particularly to absorbers in which a hydraulic fluid is used for absorbing shocks.

In submarines, it has been found desirable to support the propelling engines on anti-vibration bases or mountings, so as to prevent undue vibration of the hull. However, it has been found that when a submarine is attacked with depth bombs, the engines are apt to tear loose from their anti-vibration mountings, with the result that the submarine is unable to escape from the attacking vessel, and is eventually destroyed.

An object of the invention, therefore, is to provide an engine or other mounting which will not only absorb the steady vibrations of the engine, but will also absorb heavy shocks due to the explosion of depth bombs.

Another object of the invention is to provide an engine mounting which utilizes a hydraulic fluid to absorb sudden shocks due to the explosion of depth bombs, aerial bombs, or shocks from other causes.

A further object of the invention is to provide a combination vibration and shock absorber in which shocks are absorbed when originating either above or below the engine; also to improve engine mountings in other respects hereinafter specified and claimed.

Reference is to be had to the accompanying drawing forming a part of this specification in which Fig. 1 is a plan view of the engine mounting, Fig. 2 is a central sectional elevation of the mounting, Fig. 3 is a sectional plan view through the engine mounting taken on line 3—3 of Fig. 2, and Fig. 4 is a fragmentary elevation of the engine mounting.

Referring to the drawing by numerals, a pair of rigid spaced plates include a base plate 10 arranged to be attached to a floor through bolt holes 11, and a platform plate 12 arranged to be bolted to the base of an engine through bolt holes 13. A cylinder or chamber 14 is secured, as by welding to the bottom face of plate 12, and a larger cylinder or chamber 15 is secured to the upper face of plate 10, the two cylinders being concentrically or telescopically arranged. A heavy spiral spring 16 is positioned in the cylinder 14 and between the plates 10 and 12. Non-metallic washers 17 and 18 separate the ends of spring 16 from plates 10 and 12 respectively, so as to prevent the transmission of high frequency vibration through the spring. A non-metallic ring packing 20 extends between the cylinders 14 and 15 and the lower edges 21 of cylinder 14 are slightly rounded to permit said cylinder 14 to move freely axially in space 22 between the ring 20 and washer 17. Steel bearing plates 23 and 24 extend between washers 17 and 18 respectively, to protect said washers. A central air venting hole 25 extends through plate 24 washer 18 and plate 12 so that the space above spring 16 is open to the atmosphere at all times.

A ring 27 or other projection, is secured by welding to the outside of cylinder 14 about midway its ends, the outer diameter of said ring 27 being such that an annular space 28 is provided between said ring 27 and the cylinder 15. A helical spring 29 is positioned between cylinders 14 and 15 below the ring 27, the lower end of said ring resting on a ring bearing plate 30 which is supported on the packing ring 20. A helical spring 31 is positioned between cylinders 14 and 15 above the ring 27. An annular cap 32 extends above the cylinder 15, a clearance space 33 being provided between the inner edge of cap 32 and the cylinder 14. A downwardly extending annular flange 34 fits closely around the upper end of cylinder 15 and locking tap bolts 35 pass radially through the flange 34 and are threaded into the cylinder 15. A non-metallic packing ring 36 surrounds the cylinder 14 below the cap 32 and a metal bearing ring 37 extends between the upper end of spring 31 and ring 36.

A heavy asphalt 39 or other suitable semi-solid material is preferably poured hot in the space in cylinder 14 around the spring 16 and when solidified, the asphalt prevents the transmission of high frequency vibrations through the spring 16, at the same time permitting low frequency vibrations of the spring 16 under the influence of a moving machine supported on the platform 12. A heavy petroleum oil 40 or other suitable liquid is poured into the space between cylinders 14 and 15 around the springs 29 and 31. As the vertically movable parts 12, 14 and 27 vibrate vertically under the influence of the supported engine or other machine, the liquid 40 surges back and forth through the opening 28. In case of a shock on platform 12 such as that resulting from the explosion of a depth bomb, the space 28 so restricts the flow of liquid that the movement of the platform 12 either up or down is gradually retarded or dampened until the force is spent. This retarding action is such that the engines of the submarine do not tear loose from their mountings and the submarine has a good chance of escaping from the attacking vessel. If the depth bomb explodes above the submarine, the liquid 40 surges or displaces into the space above the ring 27, and if the bomb explodes below the submarine, the liquid 40 surges into the space below the ring 27. The springs 29 and 31 are flat or rectangular in cross-section so that the coils contact one with the other if the shock is exceedingly severe so as to act as a final limiting stop to the movement of platform 12.

The device as described above incorporates two features, (1) effective isolation of machinery vibrations and (2) complete absorption of shock due to depth bombs, collision or other emergencies. A device about twice the size of that illustrated, is capable of carrying a machinery load up to 1500 lbs. with a natural frequency of the spring system of 2.6 cps. minimum. As a shock absorber, it is capable of absorbing a force of a blow equal to or greater than that which it would experience in an actual installation, if the platform 12 is accelerated at a rate of 15 g. In this case, the force acting on the platform 12 is fifteen times the supported mass, or 22,500 lbs. This force may be applied vertically in both directions, or in any direction at an angle of as much as 50° from the vertical. The bolts 35 provide for assembly in partial compression of the spring 16. Partial removal of the bolts 35 allows dismantling of the device for inspection, replacement and repair of all parts.

The device is particularly advantageous in action as it combines a highly effective shock absorbing feature with a maximum degree of vibration isolation. The vibration isolation is accomplished by (1) The proper deflection of springs 16, 29 and 31 effecting a natural frequency of 2.6 cps.

(2) By submerging said springs in liquids of selected and proper consistency and composition for the desired degree of damping.

(3) By isolating all springs with composition pads, properly compressed, to prevent the passage of high frequency vibrations.

(4) By avoiding all metal contact between the movable and stationary parts.

I would state in conclusion that while the example illustrated constitutes a practical embodiment of my invention, I do not wish to limit myself precisely to these details, since, manifestly the same may be considerably varied without departing from the spirit of the invention as defined in the appended claims.

Having thus described my invention, I claim as new and desire to secure by Letters Patent:

1. In a device of the class described, a pair of plates in spaced parallel relation, a helical spring between said plates for absorbing vibrations imposed on one of said plates, a semi-solid material surrounding said spring for absorbing high frequency vibrations imposed on one of said plates, a cylinder secured to said vibrating plate and surrounding said spring, a second cylinder secured to the other of said plates and surrounding said first cylinder, a liquid filling the space between said cylinders, and means associated with said cylinders for causing said liquid to surge through a restricted opening so as to damp the movement of said vibrating plates when a shock is imposed on said vibrating plate.

2. In a device of the class described, a pair of spaced, substantially parallel members, a pair of telescoping cylinders between said members, vibration absorbing springs within and between said cylinders, a liquid confined between said cylinders, one of said cylinders being movable with one of said members, a projection secured to said movable cylinder and spaced from said other cylinder, and means for causing said liquid to surge through said space when said movable member is moved by a shock, said liquid serving to damp the movement of said movable member.

3. In an anti-vibration shock absorber, a base, a platform in spaced, parallel relation to said base, a cylinder extending from said platform toward said base, a second cylinder telescoping with said first cylinder and extending from said base toward said platform, a vibration absorbing spring between said platform and base within said first cylinder, a ring extending from said first cylinder toward said second cylinder and spaced apart from said second cylinder, and a liquid between said cylinders arranged to surge through said space when a shock is applied to said platform, so as to damp the movement of said platform.

4. A device as described in claim 3 characterized by anti-vibration springs on each side of said ring.

5. A device as described in claim 3 characterized by non-metallic packing members between said springs and metallic parts of said assembly so as to prevent the transmission of high frequency vibration through said springs.

6. A device as described in claim 3 characterized by a semi-solid material surrounding said spring so as to prevent high frequency vibrations from passing through said spring.

7. In a device of the class described, a pair of plates in spaced, parallel relation, telescoping cylinders extending inwardly from said plates to form a chamber therebetween, a liquid in said chamber, one of said plates and cylinders being movable and the other of said cylinders being fixed, a projection extending from said movable cylinder toward said fixed cylinder, said projection being spaced apart a predetermined distance from said fixed cylinder to form a restricted flow space, a liquid in said chamber arranged to surge through said restricted space when a shock is imposed on said movable plate, an anti-vibration spring associated with said plates and cylinder, and a cap over one of said cylinders and loosely fitting about the other of said cylinders, said cap forming a seat for an anti-vibration spring.

CARL HUSSMAN.